United States Patent
Guleryuz

(10) Patent No.: US 8,218,634 B2
(45) Date of Patent: Jul. 10, 2012

(54) NONLINEAR, IN-THE-LOOP, DENOISING FILTER FOR QUANTIZATION NOISE REMOVAL FOR HYBRID VIDEO COMPRESSION

(75) Inventor: Onur G. Guleryuz, Sunnyvale, CA (US)

(73) Assignee: NTT DoCoMo, Inc., Tokyo (JP)

( * ) Notice: Subject to any disclaimer, the term of this patent is extended or adjusted under 35 U.S.C. 154(b) by 1916 days.

(21) Appl. No.: 11/331,814

(22) Filed: Jan. 12, 2006

(65) Prior Publication Data
US 2006/0153301 A1 Jul. 13, 2006

Related U.S. Application Data

(60) Provisional application No. 60/644,230, filed on Jan. 13, 2005.

(51) Int. Cl.
*H04N 7/12* (2006.01)
(52) U.S. Cl. ............... 375/240.16; 375/240.29
(58) Field of Classification Search ............. 375/240.16, 375/240.29
See application file for complete search history.

(56) References Cited

U.S. PATENT DOCUMENTS

| | | | |
|---|---|---|---|
| 5,565,925 A | | 10/1996 | Kinouchi et al. |
| 5,587,708 A | * | 12/1996 | Chiu ............... 341/76 |
| 5,974,197 A | | 10/1999 | Lee et al. |
| 6,360,024 B1 | | 3/2002 | Tan et al. |
| 6,631,162 B1 | * | 10/2003 | Lee et al. ............ 375/240.16 |
| 6,724,944 B1 | | 4/2004 | Kalevo et al. |
| 7,206,459 B2 | * | 4/2007 | Berkner et al. ............ 382/251 |
| 2003/0219074 A1 | * | 11/2003 | Park et al. ............ 375/240.29 |
| 2004/0022315 A1 | | 2/2004 | Park et al. |
| 2004/0062316 A1 | * | 4/2004 | Xiong et al. ............ 375/240.29 |
| 2005/0025379 A1 | * | 2/2005 | Keshet et al. ............ 382/260 |
| 2005/0105817 A1 | | 5/2005 | Guleryuz |
| 2007/0047648 A1 | * | 3/2007 | Tourapis et al. ............ 375/240.13 |

FOREIGN PATENT DOCUMENTS

| | | |
|---|---|---|
| EP | 1 282 075 A2 | 2/2003 |
| JP | 03 136586 | 6/1991 |
| JP | 05 130592 | 5/1993 |
| WO | WO 2004/030369 A1 | 4/2004 |

OTHER PUBLICATIONS

PCT International Search Report for PCT Appln No. US2006/001290, mailed May 17, 2006 (4 pages).
PCT Written Opinion for PCT Appln No. US2006/001290, mailed May 17, 2006 (6 pages).
PCT Written Opinion for PCT/US2006/001290, mailed Jul. 26, 2007 (6 Pages).

* cited by examiner

*Primary Examiner* — Shuwang Liu
*Assistant Examiner* — David Huang
(74) *Attorney, Agent, or Firm* — Blakely, Sokoloff, Taylor & Zafman LLP

(57) ABSTRACT

A method and apparatus is disclosed herein for using an in-the-loop denoising filter for quantization noise removal for video compression. In one embodiment, the video encoder comprises a transform coder to apply a transform to a residual frame representing a difference between a current frame and a first prediction, the transform coder outputting a coded differential frame as an output of the video encoder; a transform decoder to generate a reconstructed residual frame in response to the coded differential frame; a first adder to create a reconstructed frame by adding the reconstructed residual frame to the first prediction; a non-linear denoising filter to filter the reconstructed frame by deriving expectations and performing denoising operations based on the expectations; and a prediction module to generate predictions, including the first prediction, based on previously decoded frames.

59 Claims, 8 Drawing Sheets

NONLINEAR, IN-THE-LOOP, DENOISING FILTER FOR QUANTIZATION NOISE REMOVAL FOR HYBRID VIDEO COMPRESSION

PRIORITY

The present patent application claims priority to the corresponding provisional patent application Ser. No. 60/644,230, titled, "A Nonlinear, In-the-Loop, Denoising Filter for Quantizaton Noise Removal for Hybrid Video Compression", filed on Jan. 13, 2005.

FIELD OF THE INVENTION

The present invention relates to the field of processing video frames; more particularly, the present invention relates to filtering quantization noise from video frames, thereby improving video compression.

BACKGROUND OF THE INVENTION

Hybrid video compression consists of encoding an anchor video frame and then predictively encoding a set of predicted frames. Predictive encoding uses motion compensated prediction with respect to previously coded frames in order to obtain a prediction error frame followed by the encoding of this prediction error frame. Anchor frames and prediction errors are encoded using transform coders in a manner well-known in the art.

FIG. 1 is a block diagram of a generic hybrid video coder. Referring to FIG. 1, a MC prediction module 110 generates a motion compensated prediction from a previously decoded frame 109. A first adder 102 subtracts the motion compensated prediction from a current frame 101 to obtain a residual frame 111. A transform coder 103 converts residual frame 111 to a coded differential 104, for example by using a combination of a transform, a quantizer, and an entropy encoder. A transform decoder 105 converts coded differential 104 to a reconstructed residual frame 112, for example by using a combination of an entropy decoder, an inverse quantizer, and an inverse transform. A second adder 106 adds reconstructed residual frame 112 to the motion compensated prediction from MC prediction module 110 to obtain a reconstructed frame 113. A delay element "Z-1" 108 stores the reconstructed frame for future reference by MC prediction module 110.

Transform coded frames incur quantization noise. Due to the predictive coding of frames, quantization noise has two adverse consequences: (i) the quantization noise in frame n causes reduced quality in the display of frame n, (ii) the quantization noise in frame n causes reduced quality in all frames that use frame n as part of their prediction.

Quantization artifact removal from images is a well-known problem. For a review and many references, Shen & Kuo, "Review of Postprocessing Techniques for Compression Artifact Removal," Journal of Visual Communication and Image Representation, vol. 9, pp. 2-14, March 1998.

For video, various types of in-the-loop filters are well-known and have become part of earlier standards. See, for example, MPEG4 Verification Model, VM 14.2, pp. 260-264, 1999, as well as ITU-T Recommendation H.261.

Prior solutions are typically limited to quantization noise produced by block transform coders. Robust solutions that handle block, as well as non-block, transforms (such as wavelets, lapped orthogonal transforms, lapped biorthogonal transforms) are not in the reach of the related art. This is because related art assumes transform coding is done using block transforms and that quantization noise mostly occurs at the boundaries of transform blocks. These prior solutions thus apply filtering around block boundaries. For non-block transforms, there are no transform block boundaries (in fact, for transforms such as wavelets and lapped transforms, there are no well-defined spatial transform boundaries since the transform basis functions overlap). Hence, these previously used solutions cannot determine where quantization noise occurs.

Prior solutions have been applied to video frames that have smoothly varying pixel values. This is because prior solutions are derived using smooth image models. The filters derived are typically restricted to low-pass filters. These are not applicable on many types of image regions, such as on edges, textures, etc.

Related art is typically restricted to a single type of quantization artifacts. Techniques typically specialize on blocking artifacts, or ringing artifacts, or other types of artifacts without providing a general means for addressing all types of artifacts.

The performance of prior techniques (in a rate-distortion sense and in a visual quality sense) is typically not high enough and their applicability not broad enough to justify the complexity of their incorporation in a video codec.

SUMMARY OF THE INVENTION

A method and apparatus is disclosed herein for using an in-the-loop denoising filter for quantization noise removal for video compression. In one embodiment, the video encoder comprises a transform coder to apply a transform to a residual frame representing a difference between a current frame and a first prediction, the transform coder outputting a coded differential frame as an output of the video encoder; a transform decoder to generate a reconstructed residual frame in response to the coded differential frame; a first adder to create a reconstructed frame by adding the reconstructed residual frame to the first prediction; a non-linear denoising filter to filter the reconstructed frame by deriving expectations and performing denoising operations based on the expectations; and a prediction module to generate predictions, including the first prediction, based on previously decoded frames.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Figure 1:
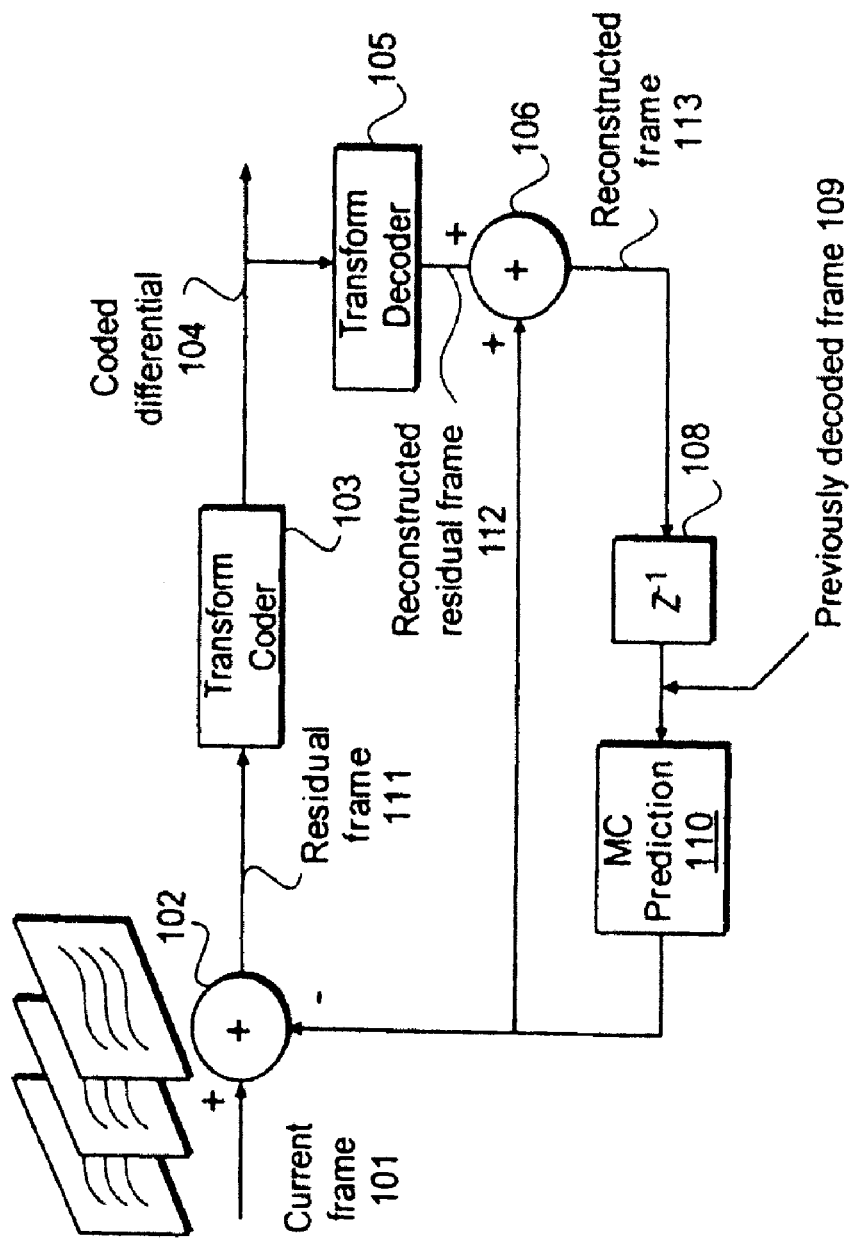
FIG. 1 illustrates a prior art video encoder.

In-the-loop, spatial, nonlinear filtering of video frames is described. The filtering is designed to remove noise incurred during the compression of the frames. In one embodiment, the filtering technique is based on deriving an expectation and implementing denoising operations based on the derived expectation. Mode based decisions are derived for the effective denoising of differentially compressed video frames. In one embodiment, weighted denoising technique is applied which further improves performance.

The described techniques are robust and general, being able to effectively handle a multitude of image region types and a multitude of compression techniques. In one embodiment, the derived nonlinear, in-the-loop denoising filters adaptively and autonomously develop the proper frequency selectivity for the multitude of image region types by developing low-pass selectivity in smooth image regions, high-pass selectivity in high-frequency regions, etc. The described technique is instrumental in concurrently removing general quantization artifacts such as, for example, blocking artifacts, ringing artifacts, etc.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Overview

Figure 2A:
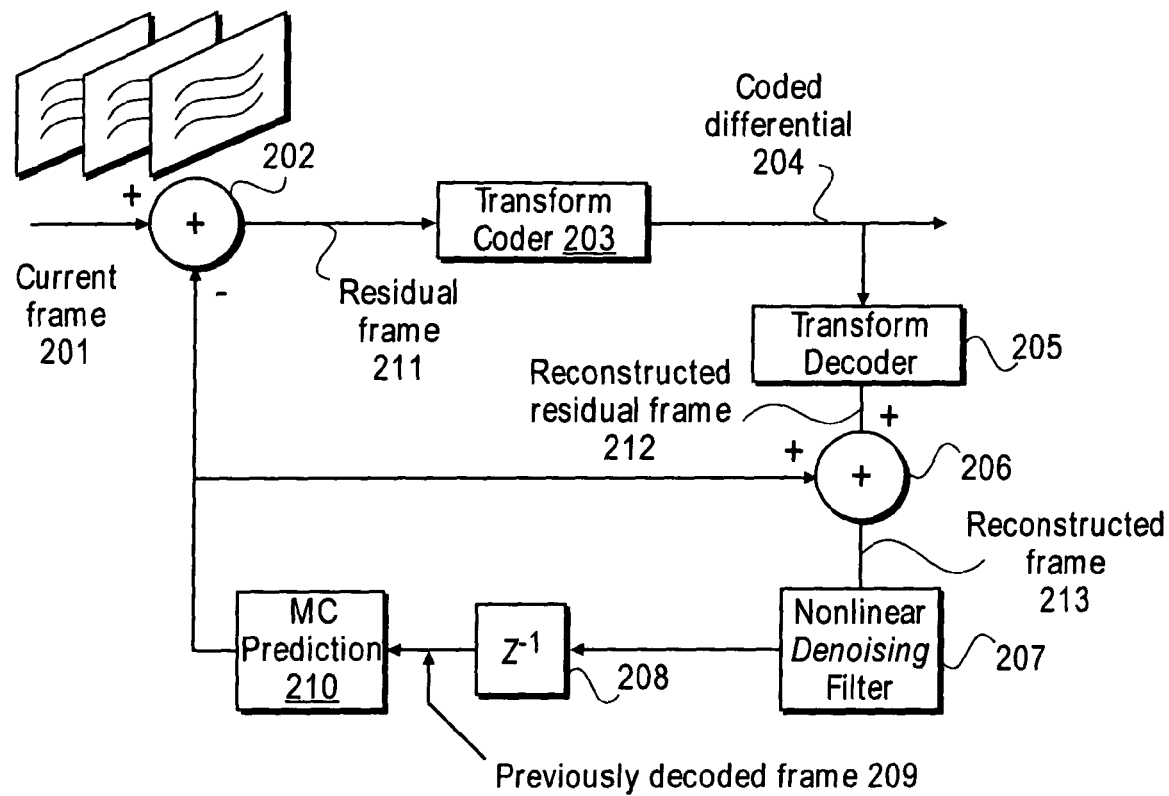
FIG. 2A is a block diagram of one embodiment of a video encoder with an in-the-loop denoising filter embedded therein.

FIG. 2A is a block diagram of one embodiment of a hybrid video encoder with an in-the-loop denoising filter embedded therein. Referring to FIG. 2A, the enhanced video encoder includes a nonlinear denoising filter 207 that filters the reconstructed frame to remove compression noise before storing it in the delay element. That is, filter 207 is embedded inside the prediction loop so that the benefits of filtering can also be used in building predictions for all frames that depend on the filtered frame.

Figure 2B:
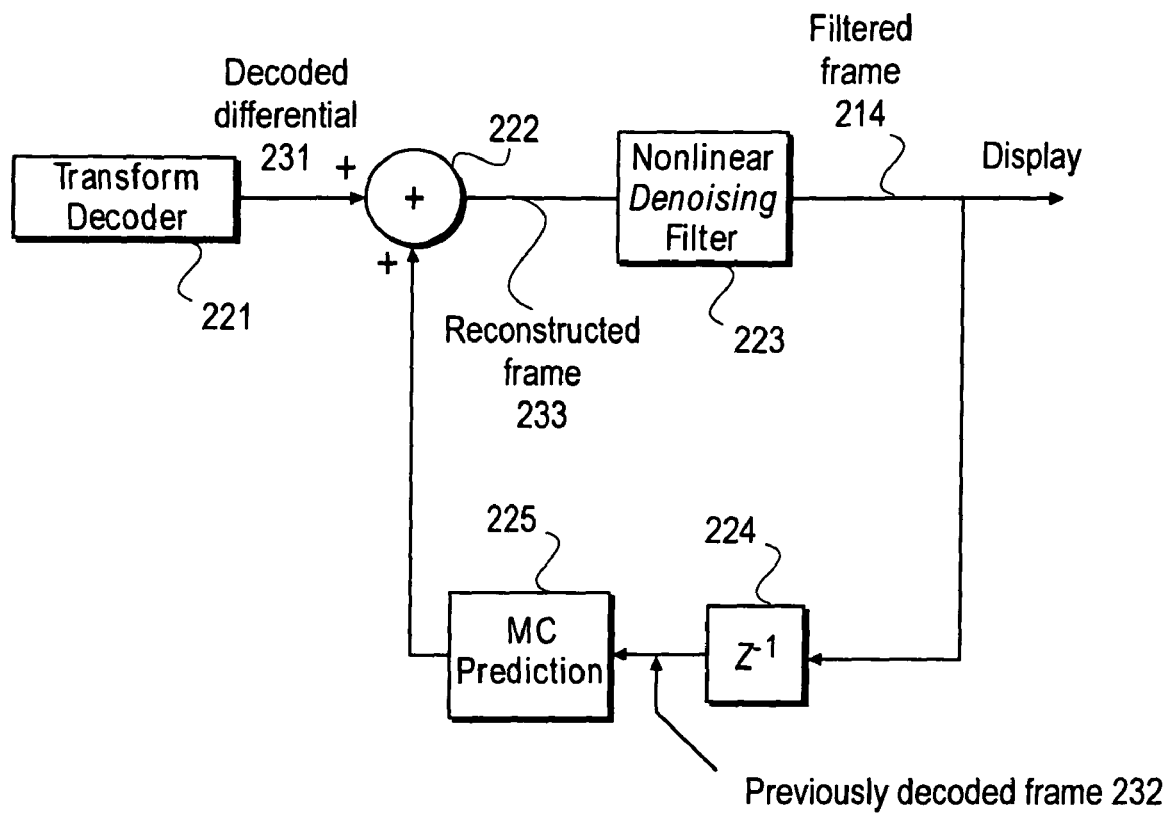
FIG. 2B is a block diagram of one embodiment of a video decoder.

FIG. 2B is a block diagram of one embodiment of a hybrid video decoder. Referring to FIG. 2B, MC prediction module 225 generates a motion compensated prediction from a previously decoded frame 232. A transform decoder 221 converts the coded differential to a reconstructed residual frame (decoded differential 231), for example by using a combination of an entropy decoder, an inverse quantizer, and an inverse transform. Adder 222 adds the reconstructed residual frame 233 to the motion compensated prediction to obtain a reconstructed frame 233. A nonlinear denoising filter 223 converts the reconstructed frame 233 to a filtered frame 234, which may be output to a display. A delay element "Z-1" 224 stores filtered frame 234 for future reference by MC prediction module 225. The operation of the nonlinear denoising filter 223 is further described below.

With respect to the denoising filters of FIGS. 2A and 2B, the denoising filter derives a statistical expectation that is used to define a denoising operation. The expectation determines whether a coefficient of a linear transform of the quantized video frame should remain as is or should be set to a predetermined value in order to obtain a better estimate of the same coefficient in the original video frame. In one embodiment, the predetermined value is zero. In one embodiment, this operation of obtaining better estimates is applied to all linear transform coefficients of the quantized video frame. Better estimates are found for all coefficients yields a better estimate of the video frame.

The denoising filter derives mode-based decisions that refine the expectation calculation and the denoising operation. Specifically, depending on the compression mode of the predictively encoded frame, the denoising filter determines the spatial locations that should be denoised. In one embodiment, the parameters that are used in the expectation calculation are also determined based on the compression mode.

In one embodiment, the expectation processing described above is performed for multiple linear transforms applied to the quantized video frame. Each linear transform determines an estimate for the video frame. Multiple linear transforms thereby result in multiple estimates. The denoising filter combines these estimates to form an overall estimate. In one embodiment, the overall estimate is better than each of the estimates individually.

In one embodiment, the linear transform applied to the quantized video frame described above is an orthonormal transform such as, for example, a block n×n DCT. Other transforms, including non-orthogonal transforms and non-block transforms can also be applied. It is desirable but not necessary for this transform to have a fast implementation so that denoising computations can be performed in an efficient manner.

Let y denote a quantized video frame (arranged into an N×1 vector), let H denote the linear transform as specified in the above paragraph (an N×N matrix). The transform coefficients are given by d=Hy. Similarly let x denote the original unquantized version of y, and let c=Hx be its transform coefficients. Consider the ith transform coefficient c(i). Observe that x and hence c are not available since only their quantized versions are available. To estimate c (and thereby x) given y, let ĉ denote the estimate of c and x̂ denote the estimate of x.

In estimating c(i), there are two possibilities: the estimate is either ĉ(i)=d(i) or ĉ(i)=0. Using conditional expectations, let Ψ be a canonical variable that encapsulates all of the available information (y, any previously decoded video frames, side information about x, etc.) In one embodiment, the estimate ĉ(i)=0 is selected over ĉ(i)=d(i) if $$E[\|c(i)\|^2|\Psi] \leq E[\|c(i)-d(i)\|^2|\Psi]$$

i.e., if the mean squared error of using ĉ(i)=0 given all the available information is less than the mean squared error of using ĉ(i)=d(i) given all the available information. This expression can be used to generate the following rule:

use ĉ(i)=0 if $|E[c(i)|\Psi]| \leq |E[c(i)|\Psi]-d(i)|$ use ĉ(i)=d(i) otherwise

The quantity E[c(i)|Ψ] is referred to herein as the conditional expectation of c(i), conditioned on all the available information. The above rule is referred to herein as the denoising rule to obtain ĉ(i).

Figure 3:
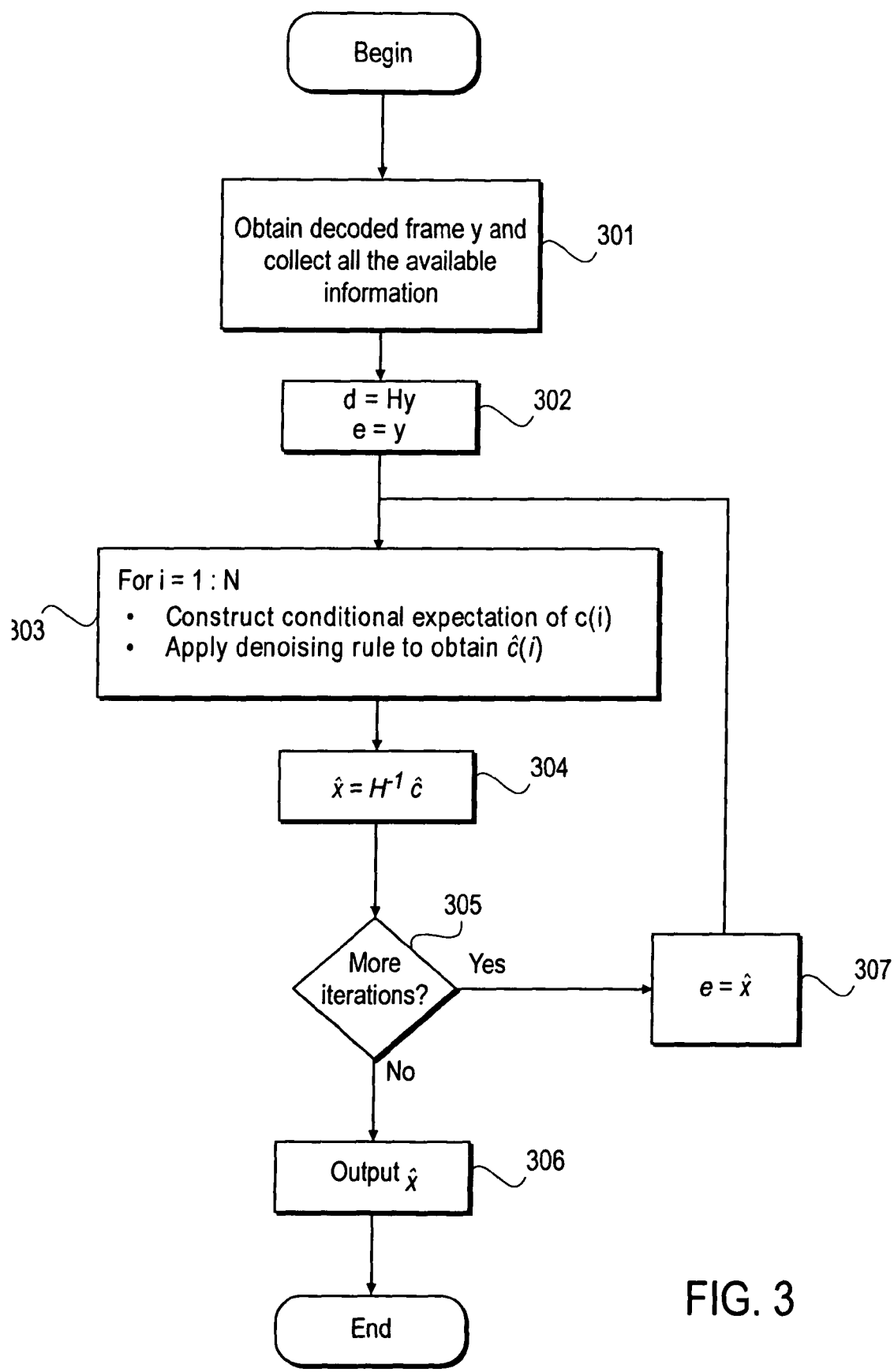
FIG. 3 is a flow diagram of one embodiment of a process for obtaining a denoised video frame.

FIG. 3 is a flow diagram of one embodiment of a process for obtaining a denoised video frame. The process is performed by processing logic that may comprise hardware (e.g., circuitry, dedicated logic, etc.), software (such as is run on a general purpose computer system or a dedicated machine), or a combination of both. Processing logic may comprise firmware. In one embodiment, the processing logic is in the denoising filter.

Referring to FIG. 3, the process begins by processing logic obtaining a decoded frame y and collecting other available information (processing block 301). The other available information may include quantization parameters, motion information, and mode information.

Then, processing logic obtains a set of coefficients d by applying a transform H to the decoded frame y (processing block 302). For example, the transform H may represent a block-wise two-dimensional DCT. Processing logic also sets a set of image elements e equal to the elements of y.

Afterwards, processing logic computes a conditional expectation of c(i) for each coefficient in d based on the set of image elements e and obtains a filtered coefficient ĉ(i) by applying a denoising rule using the value of the coefficient in d and the conditional expectation of c(i) (processing block 303). Thereafter, processing logic obtains a filtered frame x̂ by applying the inverse of transform H to the set of coefficients ĉ (processing block 304).

After obtaining the filtered frame, processing logic determines whether more iterations are needed (processing block 305). For example, a fixed number of iterations such as two, may be preset. If more iterations are needed, processing logic sets the set of image elements e to x̂ (processing block 307) and processing transactions to processing block 303. Otherwise, the processing flow proceeds to processing block 306 where the processing logic outputs the filtered frame x̂.

Due to differential encoding, some portions of the quantized frame might be the same as previously coded frames. Since these portions have already been filtered, re-filtering them may cause unintended results. In transform domain, this points to a requirement that denoising parameters must be altered for each of the coefficients. In pixel domain, this points to a requirement that not all pixel values should be changed. Furthermore, compression parameters may change spatially (or in frequency) which requires different coefficients to be denoised using different denoising parameters.

Figure 4:
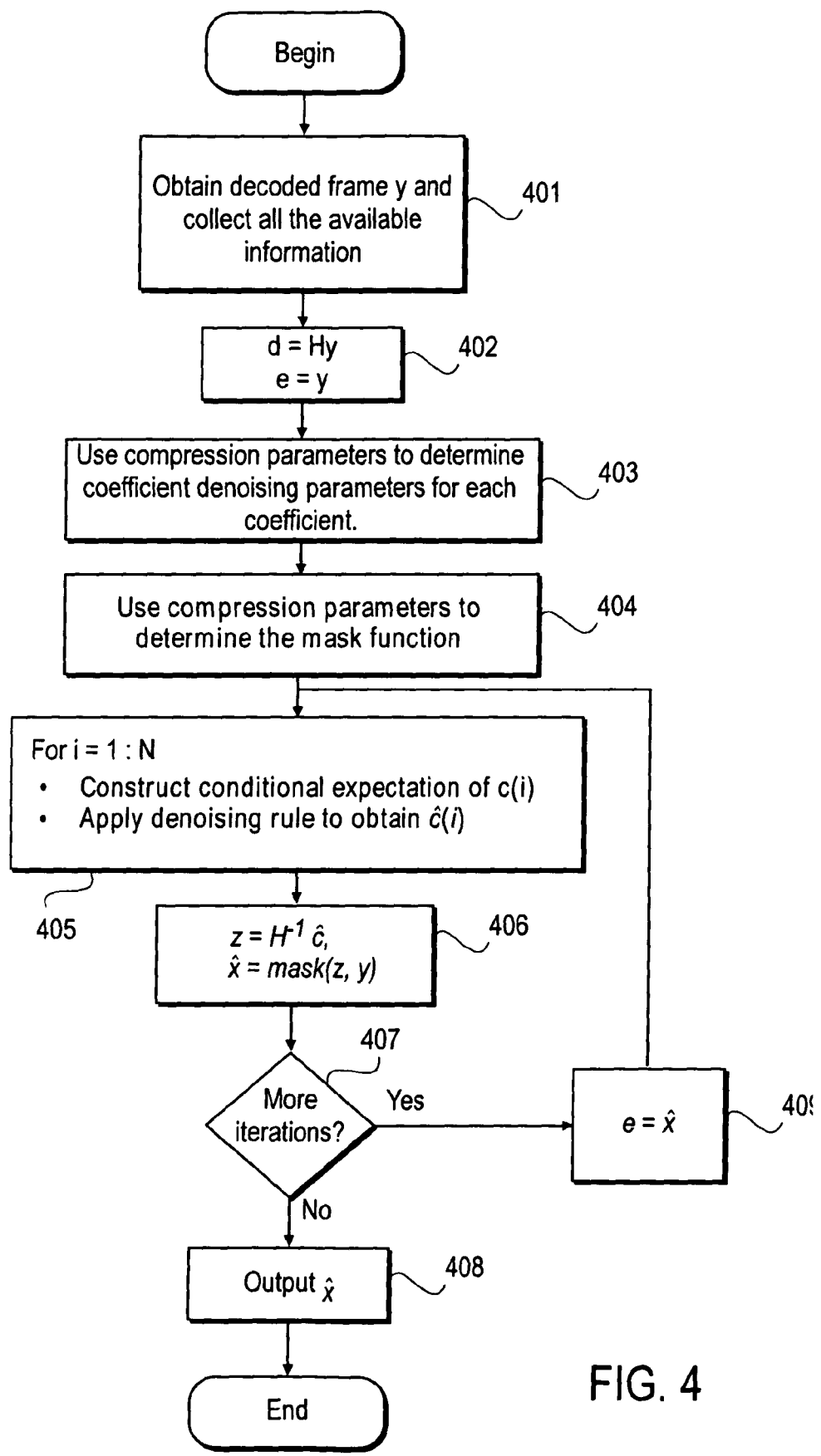
FIG. 4 is a flow diagram of an alternative embodiment of a process to alter the denoising parameters for each of the coefficients that is designed to perform denoising on a selected subset of pixels.

FIG. 4 is a flow diagram of an alternative embodiment of a modified procedure to alter the denoising parameters for each of the coefficients. Note that coefficient denoising parameters may be needed in cases other than "a requirement that not all pixel values should be changed" as well. The denoising parameters are determined using compression mode parameters of the quantized frame. The subset of pixels is determined by defining a mask using compression mode parameters of the quantized frame.

The process of FIG. 4 is performed by processing logic that may comprise hardware (e.g., circuitry, dedicated logic, etc.), software (such as is run on a general purpose computer system or a dedicated machine), or a combination of both. Processing logic may comprise firmware. In one embodiment, the processing logic is in a denoising filter.

Referring to FIG. 4, the process begins by processing logic obtaining a decoded frame y and collecting other available information (processing block 401). The other available information may include compression parameters such as quantization parameters, motion information, and mode information.

After obtaining the decoded frame and collecting other information, processing logic obtains a set of coefficients d by applying a transform H to the decoded frame y (processing block 402). For example, the transform H may represent a block-wise two-dimensional DCT. Processing logic also sets a set of image elements e equal to the elements of y.

Processing logic then determines coefficient denoising parameters for each coefficient based on compression parameters (processing block 403) and determines a mask based on compression parameters (processing block 404).

Afterwards, processing logic computes a conditional expectation of c(i) for each coefficient in d based on e and coefficient parameters and a filtered coefficient ĉ(i) by applying a denoising rule using the value of the coefficient in d and the conditional expectation of c(i) (processing block 405).

Next, processing logic obtains a filtered frame $\hat{x}$ by applying the mask function to the result of the inverse of transform H applied to the set of coefficients $\hat{c}$ (processing block 406).

Processing logic then determines whether more iterations are needed (processing block 407). For example, a fixed number of iterations such as two, may be preset. If more iterations are needed, processing logic sets the set of image elements e to $\hat{x}$ (processing block 408) and the process transitions to processing block 405; otherwise, processing transitions to processing block 408 where processing logic outputs the filtered frame $\hat{x}$.

While the above mentioned basic procedures that use a single linear transform H provide acceptable denoising performance, better performance can be obtained by using several different linear transforms, $H_1, H_2, \ldots H_M$. Each of these transforms are used in a basic procedure of its own to produce estimates of the original unquantized video frame x given by $\hat{x}_1, \hat{x}_2, \ldots, \hat{x}_M$. These individual estimates are combined to form an overall estimate $\hat{x}$ that is better than each of the estimates. One embodiment of such a process using multiple transforms is illustrated in FIG. 5.

Figure 5:
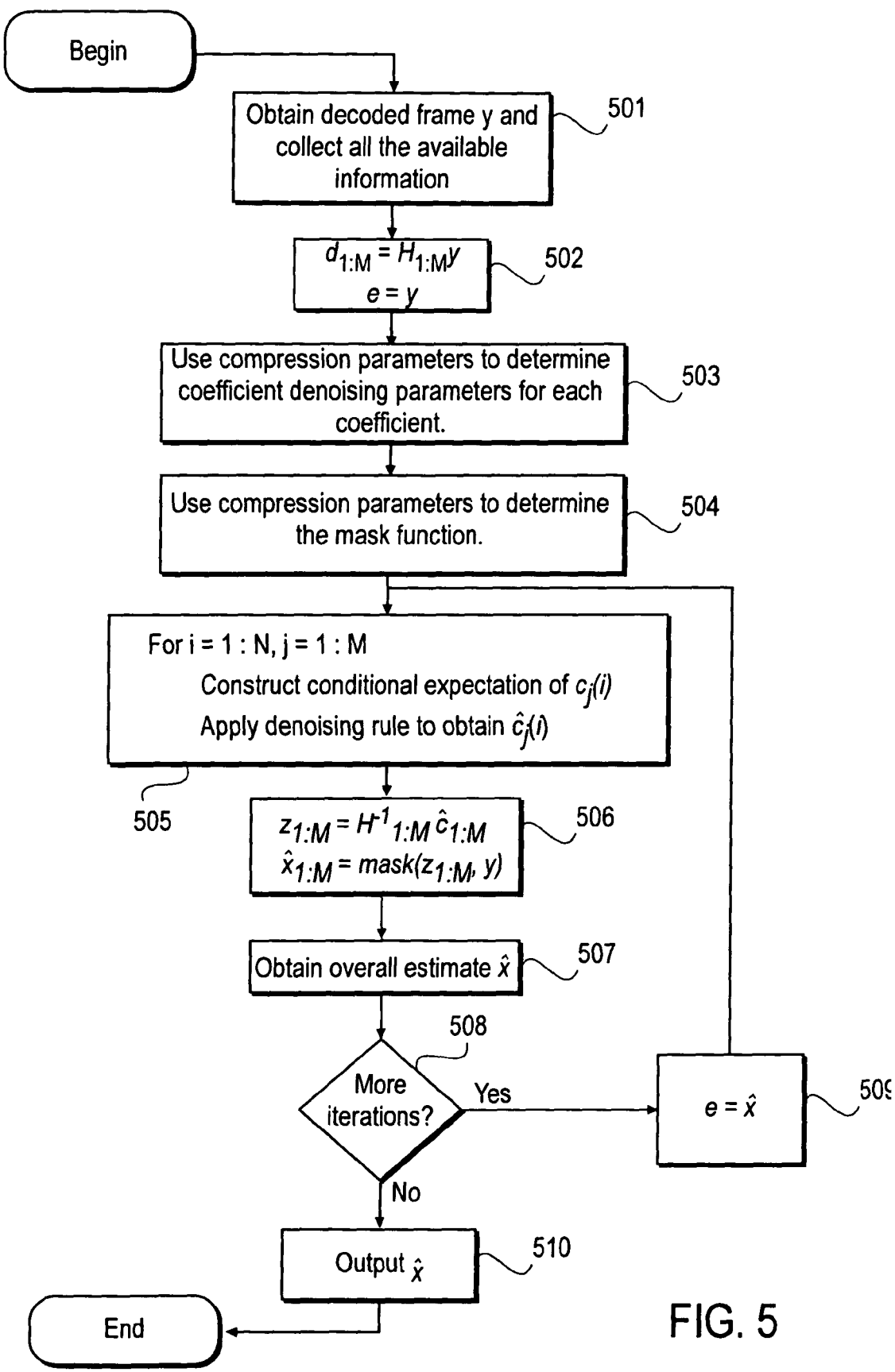
FIG. 5 is a block diagram of one embodiment of a process for obtaining a denoised video frame using a multitude of transforms.

The process of FIG. 5 is performed by processing logic that may comprise hardware (e.g., circuitry, dedicated logic, etc.), software (such as is run on a general purpose computer system or a dedicated machine), or a combination of both. Processing logic may comprise firmware. In one embodiment, the processing logic is part of a denoising filter.

Referring to FIG. 5, the process begins by processing logic obtaining a decoded frame y and collecting other available information (processing block 501). The other available information may include compression parameters such as quantization parameters, motion information, and mode information.

After obtaining the decoded frame and collecting other information, processing logic obtains a set of coefficients $d_{1:M}$ by applying M transforms $H_j$ to the decoded frame y (processing block 502). For example, each transform $H_j$ may represent a block-wise two-dimensional DCT, where the block alignment is dependent on j. Processing logic also sets a set of image elements e equal to the elements of y.

Processing logic then determines coefficient denoising parameters for each coefficient based on compression parameters (processing block 503) and determines a mask based on compression parameters (processing block 504).

With this information, processing logic computes a conditional expectation of $c_{1:M}(i)$ for each coefficient in $d_{1:M}$ based on e and coefficient parameters and obtains a filtered coefficient $\hat{c}_{1:M}(i)$ by applying a denoising rule using the value of the coefficient in $d_{1:M}$ and the conditional expectation of $c_{1:M}(i)$ (processing block 505).

Next, processing logic obtains filtered frames $\hat{x}_{1:M}(i)$ by applying the mask function to the result of the inverses of transforms $H_{1:M}$ applied to the set of coefficients $\hat{c}_{1:M}$ (processing block 506).

Processing logic then determines an overall estimate $\hat{x}$ (processing block 507). This may be performed by averaging all the estimates together. The averaging may be a weighted average. In one embodiment, the overall estimate block in FIG. 5 is given by weighted averaging of the individual estimates $\hat{x}_1, \hat{x}_2, \ldots, \hat{x}_M$. This can be done with equal weights or using more sophisticated weight determination techniques known in the art, such as, for example, the techniques set forth in Onur G. Guleryuz, "Weighted Overcomplete Denoising," Proc. Asilomar Conference on Signals and Systems, Pacific Grove, Calif., November 2003, which identifies three different weighting techniques. In one embodiment, the simplest of the three is used in the present invention. Therefore, an overall estimate is obtained, which is then masked. In an alternative embodiment, the individual estimates are masked and then an overall estimate is formed.

After obtaining the overall estimate, processing logic determines whether more iterations are needed (processing logic 508). For example, a fixed number of iterations such as two, may be preset. If more iterations are needed, processing logic sets the set of image elements e to $\hat{x}$ (processing block 509) and the process transitions to processing block 505; otherwise, processing transitions to processing block 510 where processing logic outputs the filtered frame $\hat{x}$.

Figure 6:
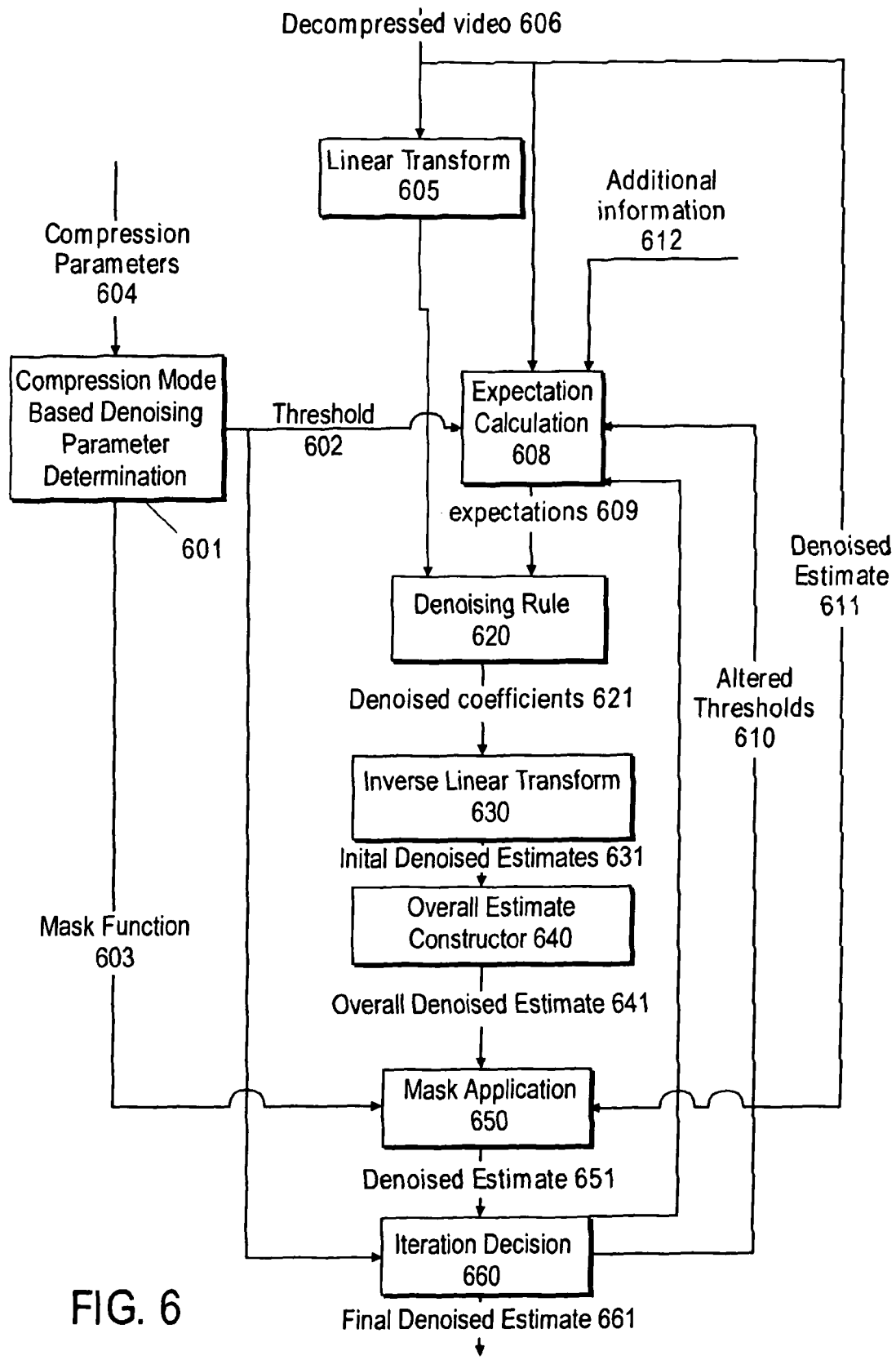
FIG. 6 is a block diagram of one embodiment of a nonlinear denoising filter.

FIG. 6 is a block diagram describing a nonlinear denoising filter. Referring to FIG. 6, a compression mode-based denoising parameter determination module 601 generates thresholds 602 and a mask function 603 based on compression parameters 604. A linear transform 605 is applied to decompressed video 606 to create coefficients 607. An expectation calculation module 608 generates expectations 609 for each coefficient of coefficients 607 based on decompressed video 606 and thresholds 602 in a first iteration, and based on altered thresholds 610 and a denoised estimate 611 in subsequent iterations. Optionally, expectation calculation module 608 may also use additional information 612, such as data from previous decompressed video frames. The operation of the module is described above.

A denoising rule module 620 generates denoised coefficients 621 based on coefficients 607 and expectations 609. The operation of module 620 is described above. An inverse linear transform 630 is applied to denoised coefficients 621 to generate initial denoised estimates 631.

An overall estimate construction module 640 combines initial denoised estimates 631 to generate an overall denoised estimate 641. A mask application module 650 selects between elements of the overall denoised estimate 641 and decompressed video 606 based on the mask function 603 to generate a denoised estimate 651. An iteration decision module 660 generates a final denoised estimate 661 equal to the denoised estimate if it is determined that a predetermined number of iterations is reached. Otherwise, thresholds are modified into altered thresholds 610. The altering of thresholds is described in greater detail below. Altered thresholds 610 and the denoised estimate 611 are fed back to expectation calculation module 608 for further iterations.

Example of Alternative Embodiments

With respect to the expectation calculation, in one embodiment, $E[c(i)|\Psi]$ is constructed with the aid of a threshold T. In one embodiment, T is taken as $\sqrt{3}$ times the standard deviation of the quantization noise that c(i) incurs. Let h be the $i^{th}$ row of H, i.e., the basis function responsible for the generation of c(i). Consider the set of coefficients obtained by shifting h spatially in a pixel neighborhood around its default spatial position and by obtaining the scalar product of the shifted basis function with e, where e=y. This neighborhood can be taken as +/−j pixels around the default spatial position and j can be set to 0, 1, 2 or higher. Suppose k coefficients in the set have magnitudes greater than T (subset 1) and the remaining l coefficients have magnitudes less than T (subset 2). Construct the average value of the coefficients in subset 1 and multiply the average with $$\frac{k}{k+l}.$$

The resulting value is assigned to $E[c(i)|\Psi]$. This calculation can be extended to incorporate coefficients from previously decoded frames that match the coefficients in the subset using motion trajectories to determine matches.

In an alternative embodiment, a threshold is not used. In such a case, only averaging is used and no thresholding (equivalently this means that l=0). Also, other forms of averaging may be used including linear averaging and nonlinear averaging (e.g., by taking a median value of the elements of the set, by taking the 2, 3, 4, 5 . . . values in the set closest to c(i), etc.). The type and detail parameters involved in averaging can be set using compression modes.

In another embodiment, a general condition expectation calculation is used in conjunction with a general denoising rule with coefficients set to 0 or d(i) based on the expectation.

In one embodiment, for the expectation calculation, after the initial denoising operation has been completed and the filtered frame $\hat{x}$ has been obtained, a second round of denoising is performed by determining $E[c(i)|\Psi]$ again using the filtered frame $\hat{x}$ rather than y as follows. In the determination of subsets 1 and 2 in i-, the scalar products of the shifts of h are obtained with $\hat{x}$ rather than with y, i.e., $e=\hat{x}$. Once the coefficients are determined, the average calculation and the $E[c(i)|\Psi]$ calculation are applied as in i- by using a threshold T' rather than T. In one embodiment, T' can be taken as T/2. This calculation can also be extended to incorporate matching coefficients from previously decoded/denoised frames using motion trajectories.

In one embodiment, mode-based decisions for the encoder utilized in hybrid video compression is an MPEG-like encoder and the compression mode alters the threshold used in the expectation calculation for each coefficient and also alters the mask function that determines the spatial locations to which denoising is applied. Below an example of mode based decisions that accomplish these two objectives is set forth.

In one embodiment, a block is an B×B rectangle of pixels, where B can be 4, 8, 16, or higher. For each coded block its mode is determined as one of:
  INTRA_QUANTIZED (a block coded in the anchor or intra mode),
  P_QUANTIZED (a block coded differentially, having at least two nonzero quantized coefficients),
  P_QUANTIZED_M (a block coded differentially, having only one nonzero quantized coefficient but with a large motion difference of 4 or more pixels with respect to a horizontal or vertical block),
  P_QUANTIZED_1 (a block coded differentially, having only one nonzero quantized coefficient with a small motion difference),
  SKIP_M (a block coded differentially, having no quantized coefficients but with a large motion difference of 4 or more pixels with respect to a horizontal or vertical block),
  SKIP (a block coded differentially, having no quantized coefficients with a small motion difference with respect to a horizontal or vertical block)
  OTHER (all other blocks).

According to its mode, each block has a spatial denoising influence that determines a spatial mask around its boundaries. The influence I is specified in pixel units and it identifies a rectangular shell of thickness of I pixels around the boundaries of the block. In one embodiment, the masks of all blocks are combined to form a frame-wide mask. Once the initial denoised estimate z is obtained, the mask is applied such that in the denoised estimate $\hat{x}$ if a pixel lies in the mask, its value is copied from z otherwise its value is copied from y.

In one embodiment, the influence factors I used in mask construction are determined as follows:
  INTRA_QUANTIZED blocks have I=B/2,
  P_QUANTIZED blocks have I=B/2,
  P_QUANTIZED_M blocks have I=B/2,
  P_QUANTIZED_1 blocks have I=B/4,
  SKIP_M blocks have I=B/4,
  SKIP blocks have I=B/4,
  OTHER blocks have I=0.

In one embodiment, mode-based denoising decisions are accomplished as follows:
  If the basis function generating a coefficient overlaps an INTRA_QUANTIZED block then that coefficient uses the given threshold T in its denoising operation,
  else, if a coefficient overlaps a P_QUANTIZED block, it uses T.
  else, if a coefficient overlaps a P_QUANTIZED_M block, it uses T,
  else, if a coefficient overlaps a P_QUANTIZED_1 block, it uses ⅞ T,
  else, if a coefficient overlaps a SKIP_M block, it uses use ½ T,
  else, if a coefficient overlaps a SKIP block, it uses use ½ T,
  else, if a coefficient overlaps a OTHER block, it is not denoised.

In one embodiment, the denoising linear transforms are given by a n×n block DCT and all of its $n^2$ spatial translations, where n is determined by the size of the video frame. For QCIF resolution frames n=4, for CIF resolution frames n=4 or n=8, etc. In general, n is expected to get larger for higher resolution video frames.

There are a number of advantages associated with embodiments of the present invention. Some of these include the following. Embodiments of the invention can accommodate video coders that use block as well as non-block transforms in transform coding. Embodiments of the invention are applicable to video frames that have pixel values due to a large range of statistics, such as low-pass, band-pass, high-pass, texture, edge, etc. The invention is not limited to video frames that have smoothly varying pixel values. Embodiments of the invention are effective in denoising a wide range of quantization artifacts, such as blocking artifacts, ringing artifacts, etc. The invention is not limited to blocking artifacts only or ringing artifacts only, etc. The rate-distortion performance of embodiment of the invention on typical video frames and the visual quality of the invention on typical video frames is significantly above related art. Also, embodiment of the invention can be deployed in a way that achieves low computational complexity.

An Exemplary Computer System

Figure 7:
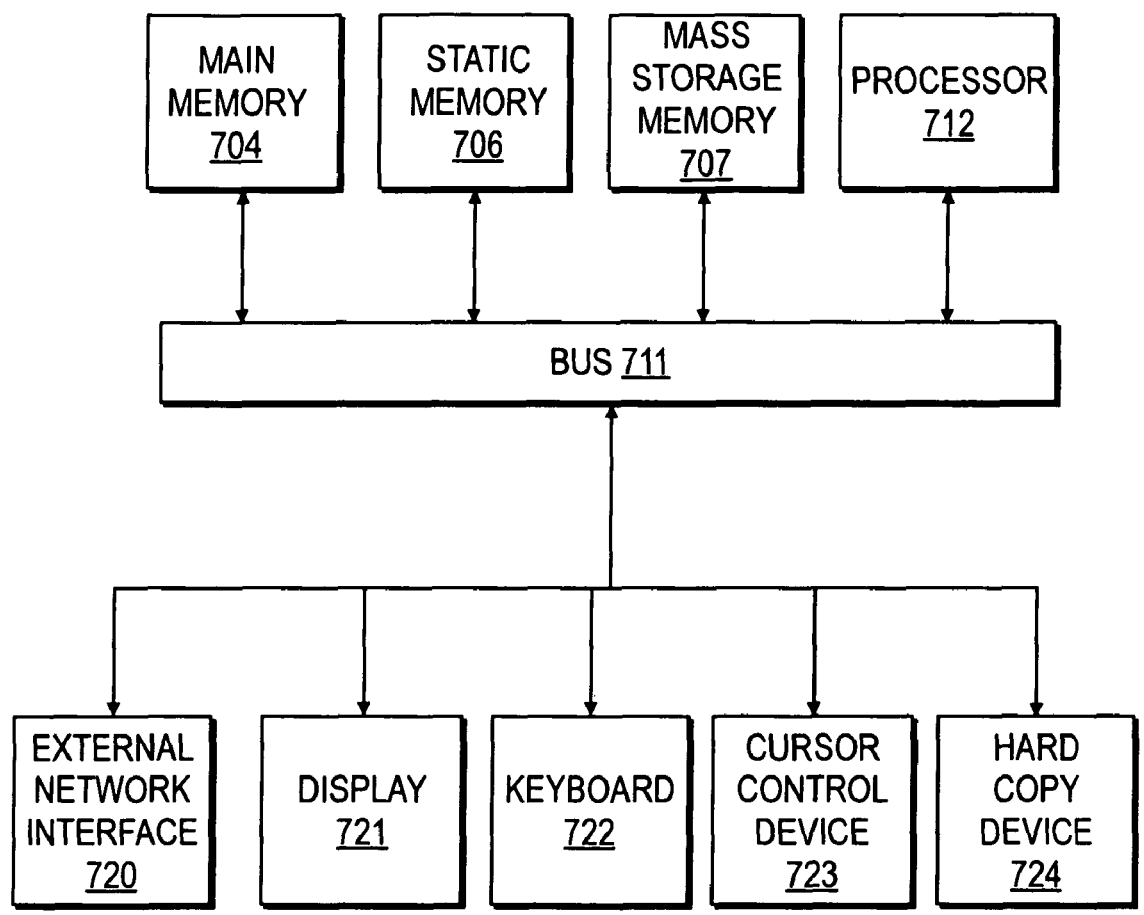
FIG. 7 is an example of a computer system.

FIG. 7 is a block diagram of an exemplary computer system that may perform one or more of the operations described herein. Computer system 700 may comprise an exemplary client or server computer system. Components described with respect to the computer system may be part of a handheld or mobile device (e.g., a cell phone).

Referring to FIG. 7, computer system 700 comprises a communication mechanism or bus 711 for communicating information, and a processor 712 coupled with bus 711 for processing information. Processor 712 includes a microprocessor, but is not limited to a microprocessor, such as, for example, Pentium™ processor, etc.

System 700 further comprises a random access memory (RAM), or other dynamic storage device 704 (referred to as main memory) coupled to bus 711 for storing information and instructions to be executed by processor 712. Main memory 704 also may be used for storing temporary variables or other intermediate information during execution of instructions by processor 712.

Computer system 700 also comprises a read only memory (ROM) and/or other static storage device 706 coupled to bus 711 for storing static information and instructions for processor 712, and a data storage device 707, such as a magnetic disk or optical disk and its corresponding disk drive. Data storage device 707 is coupled to bus 711 for storing information and instructions.

Computer system 700 may further be coupled to a display device 721, such as a cathode ray tube (CRT) or liquid crystal display (LCD), coupled to bus 711 for displaying information to a computer user. An alphanumeric input device 722, including alphanumeric and other keys, may also be coupled to bus 711 for communicating information and command selections to processor 712. An additional user input device is cursor control 723, such as a mouse, trackball, trackpad, stylus, or cursor direction keys, coupled to bus 711 for communicating direction information and command selections to processor 712, and for controlling cursor movement on display 721.

Another device that may be coupled to bus 711 is hard copy device 724, which may be used for marking information on a medium such as paper, film, or similar types of media. Another device that may be coupled to bus 711 is a wired/wireless communication capability 725 to communication to a phone or handheld palm device.

Note that any or all of the components of system 700 and associated hardware may be used in the present invention. However, it can be appreciated that other configurations of the computer system may include some or all of the devices.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

I claim:

1. A video encoder comprising a transform coder to apply a transform to a residual frame representing a difference between a current frame and a first prediction, the transform coder outputting a coded differential frame as an output of the video encoder;
   a transform decoder to generate a reconstructed residual frame in response to the coded differential frame;
   a first adder to create a reconstructed frame by adding the reconstructed residual frame to the first prediction;
   a non-linear denoising filter to filter the reconstructed frame by deriving conditional expectations of coefficients of the current frame and performing denoising operations based on the conditional expectations, wherein the denoising filter performs denoising on a selected subset of pixels, where the selected subset of pixels is determined by defining a mask using compression mode parameters of the reconstructed frame; and
   a prediction module to generate predictions, including the first prediction, based on previously decoded frames.

2. The video encoder defined in claim 1 wherein the denoising filter applies a linear transform to the reconstructed frame to obtain coefficients of the reconstructed frame.

3. The video encoder defined in claim 2 wherein the denoising filter determines whether each coefficient resulting from the linear transform of the reconstructed frame should remain as is or be set to a predetermined value and performs denoising operations based on the determination.

4. The video encoder defined in claim 3 wherein the predetermined value is zero.

5. The video encoder defined in claim 3 wherein the denoising filter constructs the expectation according to a mode-based decision.

6. The video encoder defined in claim 2 wherein the denoising filter determines, based on a compression mode, the filtering to perform on each coefficient of the reconstructed frame.

7. The video encoder defined in claim 2 wherein the denoising filter alters denoising parameters of each coefficient of the reconstructed frame.

8. The video encoder defined in claim 7 wherein altering the denoising parameters for each coefficient is based on compression mode parameters.

9. The video encoder defined in claim 1 wherein the denoising filter uses one denoising transform to obtain an estimate of the current frame.

10. The video encoder defined in claim 1 wherein the denoising filter uses a plurality of denoising transforms and combines results produced from the plurality of denoising transforms to obtain an estimate of the current frame.

11. The video encoder defined in claim 10 wherein the denoising filter combines the results by averaging the results.

12. The video encoder defined in claim 11 wherein averaging the results is performed using a per pixel weighted averaging.

13. The video encoder defined in claim 1 wherein the denoising filter uses mode-based, per coefficient threshold detection to determine whether to filter coefficients of the reconstructed frame.

14. The video encoder defined in claim 1 wherein the transform comprises a non-block transform.

15. The video encoder defined in claim 1 wherein the transform comprises a non-orthonormal transform.

16. The video encoder defined in claim 1 wherein the denoising filter estimates each coefficient of the current frame by selecting between two values, wherein the selecting is based on whether the means square error of using one value is lower than the mean square error of using the other value.

17. The video encoder defined in claim 1 wherein the denoising filter determines whether the mean square error associated with using a predetermined constant is less than the mean square error of using a corresponding coefficient of the reconstructed frame, which is a quantized version of the current frame.

18. The video encoder defined in claim 1 wherein the denoising filter performs per coefficient weighting when performing denoising to generate an estimate of the current frame.

19. The video encoder defined in claim 1 wherein the encoder sends to a decoder an indication of the number of times denoising is applied.

20. The video encoder defined in claim 1 wherein the encoder sends a decoder information used as part of the encoding process, wherein the information comprises one or more from a group consisting of the manner in which thresholds are refined from one denoising iteration to the next denoising iteration, the manner in which conditional expectations are constructed in each iteration, the number of transforms to apply, which transforms to apply, and whether weighted averaging is used.

21. A video encoder comprising
a transform coder to apply a transform to a residual frame representing a difference between a current frame and a first prediction, the transform coder outputting a coded differential frame as an output of the video encoder;
a transform decoder to generate a reconstructed residual frame in response to the coded differential frame;
a first adder to create a reconstructed frame by adding the reconstructed residual frame to the first prediction;
a non-linear denoising filter to filter the reconstructed frame by deriving conditional expectations of coefficients of the current frame and performing denoising operations based on the conditional expectations; and
a prediction module to generate predictions, including the first prediction, based on previously decoded frames,
wherein the denoising filter applies a linear transform to the reconstructed frame to obtain coefficients of the reconstructed frame and determines, based on a compression mode, the filtering to perform on each coefficient of the reconstructed frame, wherein the compression mode of a macroblock is based on motion vectors and a mode of the macroblock.

22. A video encoder comprising
a transform coder to apply a transform to a residual frame representing a difference between a current frame and a first prediction, the transform coder outputting a coded differential frame as an output of the video encoder;
a transform decoder to generate a reconstructed residual frame in response to the coded differential frame;
a first adder to create a reconstructed frame by adding the reconstructed residual frame to the first prediction;
a non-linear denoising filter to filter the reconstructed frame by deriving conditional expectations of coefficients of the current frame and performing denoising operations based on the conditional expectations; and
a prediction module to generate predictions, including the first prediction, based on previously decoded frames,
wherein the denoising filter performs a process comprising:
obtaining the reconstructed frame and other available information;
obtaining a set of coefficients of the reconstructed frame by applying a transform to the reconstructed frame;
setting a set of image elements equal to elements of the reconstructed frame;
determining coefficient parameters and a mask function based on compression parameters;
computing the conditional expectation of for each coefficient in the set of coefficients obtained by applying the transform to the reconstructed frame based on the set of image elements, and obtaining a set of filtered coefficients by applying a denoising rule using the value of the coefficient in the set of coefficients and the conditional expectation; and
obtaining a filtered frame by applying the mask function to a result of an inverse of the transform applied to the set of filtered coefficients.

23. The video encoder defined in claim 22 further comprising:
determining the mask function using compression parameters and using the mask to determine to which coefficients in the set of coefficients to apply denoising.

24. The video encoder defined in claim 22 wherein the set of coefficients is obtained by applying multiple transforms to the coefficients of the reconstructed frame and generating the filtered frame comprises applying inverse transforms to the set of the filtered coefficients, applying the mask function to the result of the inverse of the transform applied to the set of filtered coefficients, and combining the result of each of the separate inverse transforms subject to the mask function to create an overall estimate of the current frame.

25. A video encoder comprising
a transform coder to apply a transform to a residual frame representing a difference between a current frame and a first prediction, the transform coder outputting a coded differential frame as an output of the video encoder;
a transform decoder to generate a reconstructed residual frame in response to the coded differential frame;
a first adder to create a reconstructed frame by adding the reconstructed residual frame to the first prediction;
a non-linear denoising filter to filter the reconstructed frame by deriving conditional expectations of coefficients of the current frame and performing denoising operations based on the conditional expectations; and
a prediction module to generate predictions, including the first prediction, based on previously decoded frames,
wherein the denoising filter performs weighted averaging in the transform domain to generate an estimate of the current frame.

26. A decoder comprising:
a transform decoder to generate a decoded differential frame;
an adder to create a reconstructed frame in response to the decoded differential frame and a first prediction;
a denoising filter to filter the reconstructed frame by deriving conditional expectations of coefficients of an original frame and performing denoising operations based on the conditional expectations, wherein the denoising filter performs denoising on a selected subset of pixels, where the subset of pixels is determined by defining a mask using compression mode parameters of the reconstructed frame; and
a prediction module to generate predictions, including the first prediction, based on previously decoded frames.

27. The video decoder defined in claim 26 wherein the denoising filter applies a linear transform to the reconstructed frame to obtain coefficients of the original frame.

28. The video decoder defined in claim 27 wherein the denoising filter determines whether each coefficient resulting from the linear transform of the reconstructed frame should remain as is or be set to a predetermined value and performs denoising operations based on the determination.

29. The video decoder defined in claim 28 wherein the denoising filter constructs the expectation according to a mode-based decision.

30. The video decoder defined in claim 27 wherein the denoising filter determines, based on a compression mode, the filtering to perform on each coefficient of the reconstructed frame.

31. The video decoder defined in claim 27 wherein the denoising filter alters denoising parameters of each coefficient of the reconstructed frame.

32. The video decoder defined in claim 31 wherein altering the denoising parameters for each coefficient is based on compression mode parameters.

33. The video decoder defined in claim 26 wherein the denoising filter uses one denoising transform to obtain an estimate of the original frame.

34. The video decoder defined in claim 26 wherein the denoising filter uses a plurality of denoising transforms and combines results produced from the plurality of denoising transforms to obtain an estimate of the original frame.

35. The video decoder defined in claim 34 wherein the denoising filter combines the results by averaging the results.

36. The video decoder defined in claim 35 wherein averaging the results is performed using a per pixel weighted averaging.

37. The video decoder defined in claim 26 wherein the denoising filter uses mode-based, per coefficient threshold detection to determine whether to filter coefficients of the reconstructed frame.

38. The video decoder defined in claim 26 wherein in the denoising filter estimates each coefficient of the original frame by selecting between two values, wherein the selecting is based on whether the means square error of using one value is lower than the mean square error of using the other value.

39. The video decoder defined in claim 38 wherein the denoising filter determines whether the mean square error associated with using a predetermined constant is less than the mean square error of using the a corresponding coefficient of the reconstructed frame, which is a quantized version of the original frame.

40. The video decoder defined in claim 26 wherein the denoising filter performs per coefficient weighting when performing denoising to generate an estimate of the original frame.

41. The video decoder defined in claim 26 wherein the encoder sends to a decoder an indication of the number of times denoising is applied.

42. The video decoder defined in claim 26 wherein the encoder sends a decoder information used as part of the encoding process, wherein the information comprises one or more from a group consisting of the manner in which thresholds are refined from one denoising iteration to the next denoising iteration, the manner in which conditional expectations are constructed in each iteration, the number of transforms to apply, which transforms to apply, and whether weighted averaging is used.

43. A decoder comprising:
a transform decoder to generate a decoded differential frame;
an adder to create a reconstructed frame in response to the decoded differential frame and a first prediction;
a denoising filter to filter the reconstructed frame by deriving conditional expectations of coefficients of an original frame and performing denoising operations based on the conditional expectations; and
a prediction module to generate predictions, including the first prediction, based on previously decoded frames,
wherein the denoising filter applies a linear transform to the reconstructed frame to obtain coefficients of the original frame and determines, based on a compression mode, the filtering to perform on each coefficient of the reconstructed frame, wherein the compression mode of a macroblock is based on motion vectors and a mode of the macroblock.

44. A decoder comprising:
a transform decoder to generate a decoded differential frame;
an adder to create a reconstructed frame in response to the decoded differential frame and a first prediction;
a denoising filter to filter the reconstructed frame by deriving conditional expectations of coefficients of an original frame and performing denoising operations based on the conditional expectations; and
a prediction module to generate predictions, including the first prediction, based on previously decoded frames,
wherein the denoising filter performs a process comprising:
obtaining the reconstructed frame and other available information;
obtaining a set of coefficients of the reconstructed frame by applying a transform to the decoded frame;
setting a set of image elements equal to elements of the reconstructed frame;
determining coefficient parameters and a mask function based on compression parameters;
computing a conditional expectation for each coefficient in the set of coefficients obtained by applying the transform to the reconstructed frame, and obtaining a set of filtered coefficients by applying a denoising rule using the value of each coefficient in the set of coefficients and the conditional expectation; and
obtaining a filtered frame by applying the mask function to a result of an inverse of the transform applied to the set of filtered coefficients.

45. The video decoder defined in claim 44 further comprising:
determining the mask function using compression parameters and using the mask to determine to which coefficients in the set of coefficients to apply denoising.

46. The video decoder defined in claim 44 wherein the set of coefficients is obtained by applying multiple transforms to the coefficients of the reconstructed frame and generating the filtered frame comprises applying inverse transforms to the set of the filtered coefficients, applying the mask function to the result of each inverse transform, and combining the result of each of the separate inverse transforms subject to the mask function to create an overall estimate of the original frame.

47. A decoder comprising:
a transform decoder to generate a decoded differential frame;
an adder to create a reconstructed frame in response to the decoded differential frame and a first prediction;
a denoising filter to filter the reconstructed frame by deriving conditional expectations of coefficients of an original frame and performing denoising operations based on the conditional expectations, wherein the denoising filter performs weighted averaging in the transform domain to generate an estimate of the original frame; and
a prediction module to generate predictions, including the first prediction, based on previously decoded frames.

48. A video decoding process comprising:
generating a decoded differential frame;
creating a reconstructed frame in response to the decoded differential frame and a first prediction;
computing a conditional expectation for each of a plurality of coefficients of an original frame;
performing denoising operations based on the conditional expectation and a coefficient resulting from application of a linear transform to the reconstructed frame, wherein performing denoising occurs on a selected subset of pixels, where the subset of pixels is determined by defining a mask using compression mode parameters of the reconstructed frame; and
generating predictions, including the first prediction, based on previously decoded frames.

49. The video decoding process defined in claim 48 further comprising: determining whether each coefficient resulting from the linear transform of the reconstructed frame should remain as is or be set to a predetermined value, and wherein performing denoising operations is based on the determination.

50. The video decoding process defined in claim 49 wherein the predetermined value is zero.

51. The video decoding process defined in claim 50 further comprising refining the expectation according to a mode-based decision.

52. The video decoding process defined in claim 48 further comprising:
applying a plurality of denoising transforms to quantized video data; and
combining results produced from the plurality of denoising transforms to obtain an estimate of the original frame.

53. The video decoding process defined in claim 48 wherein performing the denoising operation comprises determining, based on a compression mode, the filtering to perform on each coefficient of the quantized reconstructed frame.

54. The video decoding process defined in claim 48 wherein performing denoising operations comprises estimating each coefficient of the original frame by selecting between two values, wherein the selecting is based on whether the means square error of using one value is lower than the mean square error of using the other value.

55. The video decoding process defined in claim 48 wherein performing denoising operations comprises determining whether the mean square error associated with using a predetermined constant is less than the mean square error of using a corresponding coefficient of the reconstructed frame, which is a quantized version of the original frame.

56. The video decoding process defined in claim 48 further comprising:
altering denoising parameters for each coefficient of the rescontructed frame based on compression mode parameters.

57. A video decoding process comprising:
computing a conditional expectation for each of a plurality of coefficients of an original frame; and
performing denoising operations based on the conditional expectation and a coefficient resulting from application of a linear transform to a corresponding reconstructed frame, and further comprising:
obtaining the reconstructed frame and other available information;
obtaining a set of coefficients of the reconstructed frame by applying a transform to the decoded frame;
setting a set of image elements equal to elements of the reconstructed frame;
determining coefficient parameters and a mask function based on compression parameters;
computing the conditional expectation for each coefficient in the set of coefficients obtained by applying the transform to the reconstructed frame, and obtaining a set of filtered coefficients by applying a denoising rule using the value of the coefficient in the set of coefficients and the conditional expectation; and
obtaining a filtered frame by applying the mask function to a result of an inverse of the transform applied to the set of filtered coefficients.

58. The video decoding process defined in claim 57 further comprising:
determining the mask function using compression parameters and using the mask to determine to which coefficients in the set of coefficients to apply denoising.

59. The video decoding process defined in claim 58 further comprising applying multiple transforms to the coefficients of the reconstructed frame to obtain the set of coefficients; and wherein generating filtered frame comprises applying inverse transforms to the set of the filtered coefficients, applying the mask function to the result of the inverse of the transform applied to the set of filtered coefficients, and combining the result of each of the separate inverse transforms subject to the mask function to create an overall estimate of the original frame.

* * * * *